Aug. 19, 1941.     C. MOURER     2,252,942
METAL SPRAY GUN
Filed July 1, 1938     2 Sheets-Sheet 1
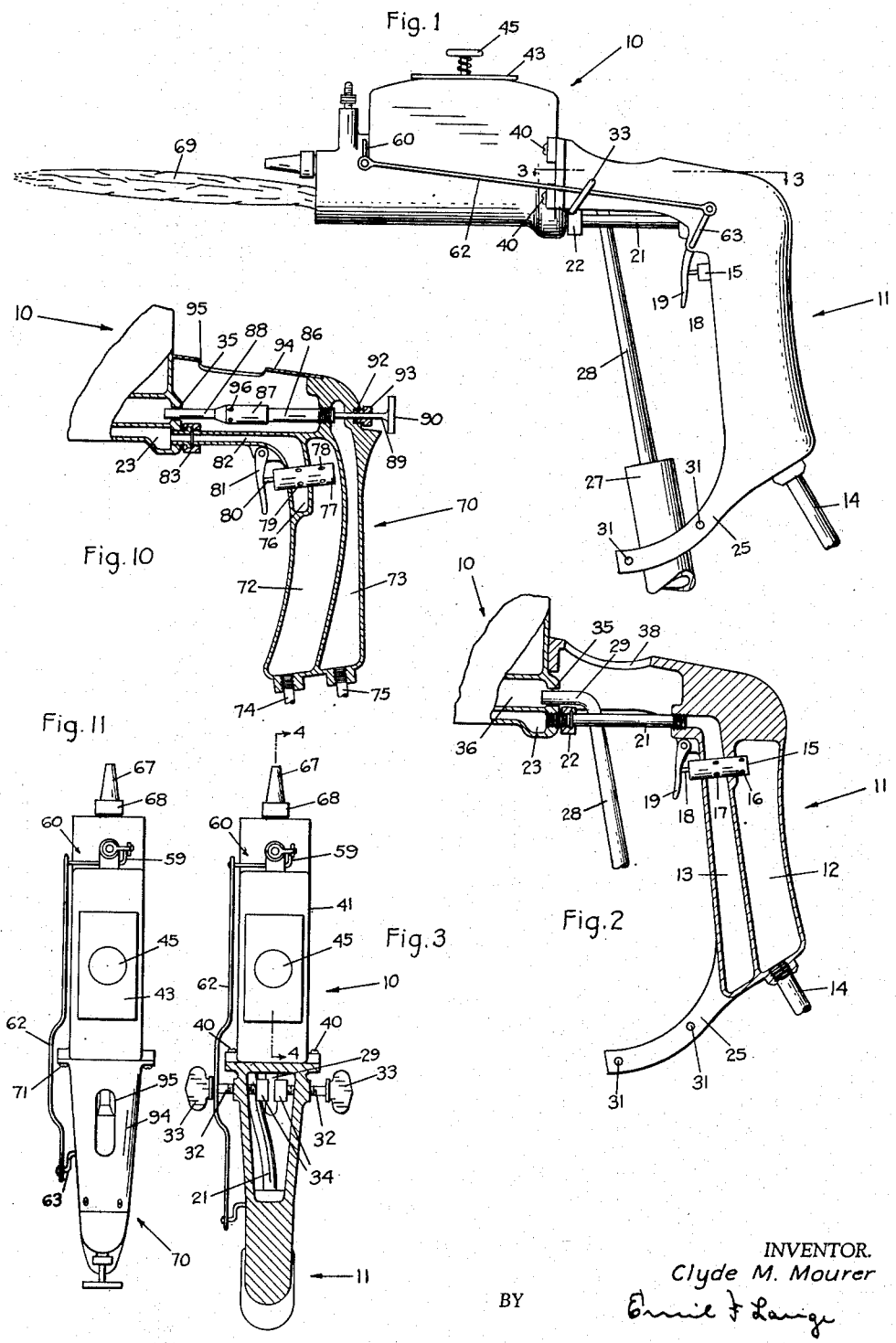
INVENTOR.
Clyde M. Mourer
BY
ATTORNEY.

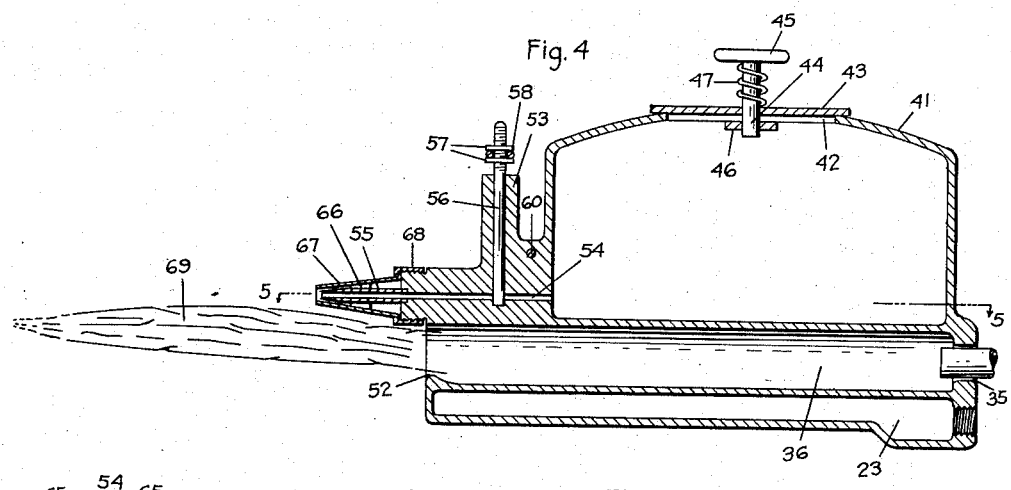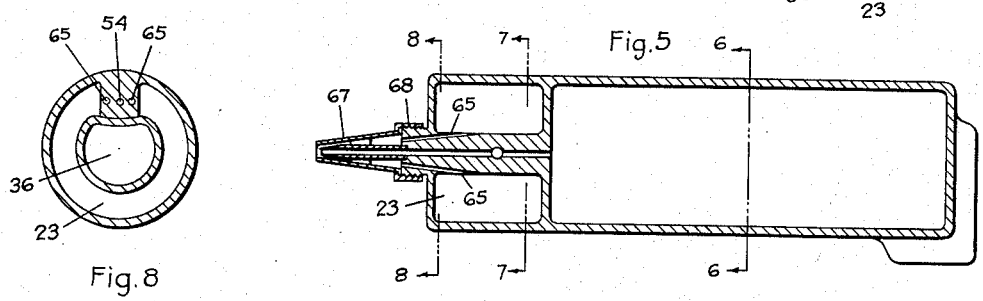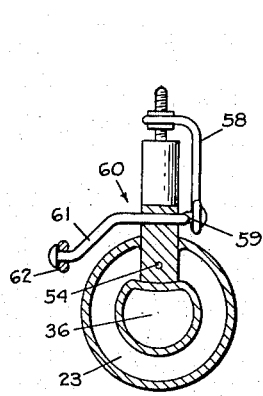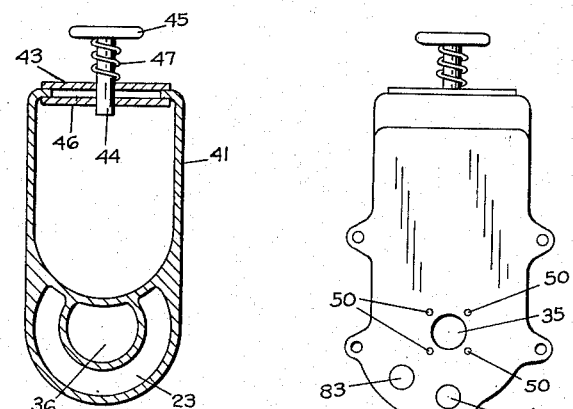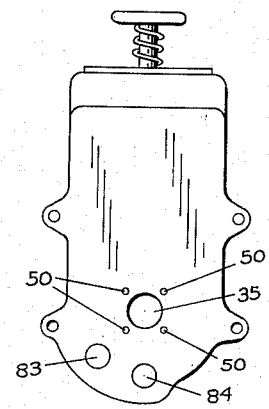

Patented Aug. 19, 1941

2,252,942

UNITED STATES PATENT OFFICE 2,252,942

METAL SPRAY GUN

Clyde M. Mourer, Lincoln, Nebr.

Application July 1, 1938, Serial No. 216,982

3 Claims. (Cl. 91—12.2)

The present invention relates to a solder spray gun which is adaptable for applying solder to any desired metal, particularly a metal which can be tinned. In the ordinary soldering process, it is necessary to apply the solder by hand to the object to be soldered, moving the solder along as it is melted by the soldering iron. Thereafter it is necessary to work on the solder to thoroughly amalgamate it with the metal and to form a smooth joint. This last process is known as "paddling." Such a soldering process is necessarily quite tedious and does not produce as neat a joint as might be desired. Consequently, it is necessary after the soldering is done to grind the joint to a considerable extent to remove any irregularities. The present invention is concerned with a solder spray gun whereby the solder can be applied to the metal to be soldered in a uniform and expeditious manner. While solder spray guns have been provided, these guns have the disadvantage that they make no provision for heating the metal simultaneously with the application of the solder so as to operate in the most expeditious manner. These guns have numerous other defects which have hindered their extensive use.

An object of the present invention is to provide a solder spray gun in which the metal to be soldered is heated simultaneously with the ejection of solder from the gun.

A further object of the invention is to provide a solder spray gun in which a flame is used to simultaneously heat both the solder to maintain the same in a liquid form and to heat the material being soldered.

A further object of the invention is to provide a solder spray gun in which a single actuator is provided for simultaneously controlling both a valve controlling the admission of air to the ejecting nozzle and a valve controlling the flow of solder to the ejecting nozzle.

A further object of the invention is to provide a solder spray gun in which the solder is sealed from the atmosphere both in the gun and in its travel to the metal to be soldered.

A further object of the invention is to provide a spray gun in which liquid solder is forced through the flame along substantially the path thereof so that the flame and solder are applied to the metal worked on at the same point.

A further object of the invention is to provide a spray gun which can employ as a heating element thereof a conventional acetylene torch.

Other objects of the present invention will be apparent from a consideration of the accompanying specification, claims, and drawings in which Figure 1 is a side elevational view of one form of the improved spray gun;

Figure 2 is a sectional view of the combined handle and air inlet chamber of the spray gun, the section being taken longitudinally through the center of the handle;

Figure 3 is a top elevational view of the spray gun with a portion of the combined handle and air inlet chamber being shown in section, the section being taken along the line 3—3 of Figure 1 in the direction of the arrows adjacent said line;

Figure 4 is a longitudinal sectional view of the main portion of the spray gun, the section being taken along the line 4—4 of Figure 3 in the direction of the arrows;

Figure 5 is a longitudinal sectional view of the main portion of the spray gun, the section being taken along the lines 5—5 of Figure 4;

Figures 6, 7, and 8 are transverse sectional views of the spray gun, these sections being taken along the lines 6—6, 7—7, and 8—8 respectively of Figure 5;

Figure 9 is an end elevational view of the main body portion of the spray gun, this view being taken from the right of Figure 4;

Figure 10 is a longitudinal sectional view of the handle and burner portion of a modified form of spray gun; and Figure 11 is a top elevational view of the modified form of the invention.

For a more detailed understanding of the invention, reference is made to the drawings in which the same reference characters are used to refer to the same parts throughout the several views.

Referring to Figure 1, it will be noted that my improved spray gun consists of a main body portion generally indicated by the reference numeral 10 to which is secured a handle portion generally indicated by the reference numeral 11. The handle portion 11 serves to house the air inlet and air control means in one modification, and in a second modification to house the burner itself.

Referring to Figure 2, it will be noted that the handle portion 11 has two hollow chambers 12 and 13 therein. The chamber 12 is provided with an opening at the bottom to which is connected a pipe 14 leading to a suitable source of compressed air. Extending between the two chambers 12 and 13 is a hollow cylinder 15 closed at its inner end. This cylinder is provided with perforations 16 opening into the chamber 12 and other perforations 17 opening into the chamber 13. It will be readily apparent that unless the passage between apertures 16 and 17 is impeded, air may enter the apertures 16, pass through the cylinder 15, and out of the apertures 17 into the chamber 13. Communication between the two apertures is controlled by a suitable valve located within the cylinder 15. The valve is provided with a stem 18 against which bears a trigger lever 19. The valve is biased outwardly in valve closing direction and upon movement of the trigger lever 19 inwardly, the valve is moved to open position to permit air to pass from chamber 12 to chamber 13. The upper end of chamber 13 terminates in an opening to which is secured a pipe 21. The pipe 21 is in turn connected through a suitable coupling device 22 to the interior of a chamber 23 in the main body portion 10. The lower portion of the handle 11 is provided with two spaced arms 25. The arms 25 are spaced apart a distance such as to receive the mixing chamber 27 of a conventional acetylene welding torch. Extending from the mixing chamber 27 is a pipe 28 which is provided with a curved burner tip 29. The arms 25 are provided with two apertures 31 through which suitable clamping bolts may be inserted. The portion of the handle 11 adjacent the main body portion 10 is hollow. Extending through the side walls of this portion of the handle member 11 are screws 32 which screws are provided with thumb pieces 33. At their inner ends the screws carry clamps 34 which are adapted to engage the curved portion 29 of the acetylene torch. By tightening up on the screws 32 and by simultaneously tightening the clamping bolts extending through apertures 31, the acetylene torch may be rigidly held in any desired position. In this clamped position, the curved end 29 should extend through an opening leading into a burner chamber 36. The opening 35 is slightly larger than the pipe 29 so as to permit free access of air around the pipe 29 and the chamber 36. This air enters the handle portion through an opening 38 in the top wall of the handle member 11. As indicated in Figure 3, the handle portion is secured to the main body portion by screws 40 or other suitable fastening means.

Referring to Figure 4, it will be noted that both the air opening 23 and the burner chamber 36 extend substantially the full length of the body portion 10. The body portion is formed above the burner chamber 36 as a receptacle 41 which receptacle is adapted to receive solder. The receptacle 41 is provided with an elongated opening 42 for the insertion of the solder. This opening is normally covered by a lid 43. Extending through the cover 43 is a plunger 44 having a push button 45. Adjacent the lower end of the plunger 44 is a bar 46 which has a length greater than the width of the opening 42 but less than the length of the opening 42. A spring 47 is located between the push button 45 and the cover 43. The arrangement consisting of stem 44, bar 46, and spring 47 provides a method for locking cover 43 securely in place. In view of the fact that bar 46 has a length less than the length of opening 42, the bar 46 can be removed through opening 42 by rotating the knob 45 through an angle of 90 degrees. This permits the removal of the entire assemblage including cover 43. By reason of the spring 47, the cover 43 is normally held in tight engagement with the top of casing 41.

As best indicated in Figure 9, the opening 35 is surrounded by a number of small openings 50. The air passing through opening 38 is able to pass through these openings and through the space between the edge of opening 35 and the burner tip 29. This air supports the combustion of the acetylene mixture issuing from the nozzle 29 so that a relatively long flame is projected from the nozzle 35 through the burner chamber 36 and out of an opening 52 at the left hand end of burner chamber 36. As the flame passes through a burner chamber 36 it heats the solder contained within the solder receptacle 41, reducing the solder to a molten state. A passage 54 communicates with the interior of the receptacle 41. A cylindrical nozzle member 55 is detachably secured in the end of the body portion 10 in communication with the aperture 54. The flow of solder through aperture 54 is controlled by a valve consisting of a rod 56 extending through an upstanding boss 53, the rod 56 has threadedly secured to its upper end two spaced collars 57. Secured between the two collars 57 is a link member 58 which is pivotally connected to a horizontal arm 59 of a crank member 60 as best shown in Figures 3 and 7. The crank member 60 is pivotally secured in the body portion and has a crank arm 61 to which is pivotally connected a link 62. The link 62 is in turn connected to a crank arm 63 constituting an extension of the trigger lever 19. As will be noted from Figure 1, movement of the trigger lever 19 inwardly causes the crank arm 63 to be rocked in a counter-clockwise direction, causing link 62 to be moved to the left. Movement to the left of link 62 causes the crank 60 to be rotated in a clockwise direction, which in turn rocks the link 58 upwardly to lift the valve 56 and move the same to open position. Thus when the trigger lever 19 is moved inwardly to admit air from chamber 12 to chamber 13 and hence into the air chamber 23, the valve member 56 is simultaneously opened to permit a flow of molten solder through the passage 54 to the nozzle 55.

The air chamber, as best indicated in Figures 6 and 7, partially surrounds the burner chamber 36. The air passing through chamber 23 is thus heated to quite a high temperature. The forward end of the air chamber 23, as best shown in Figure 8, communicates with a pair of passages 65 disposed on opposite sides of the solder passage 54. An outer nozzle member 67 is secured by means of a coupling nut 68 to the body of the soldering tool in such a manner that the nozzle members 55 and 67 are concentric and so that the two fluids issuing therefrom are merged. The desired concentric relation between members 67 and 55 is maintained through inwardly directed radial spacing arm secured to nozzle member 67, these arms being indicated by the reference character 66. The two passages 65 are in communication with the space between the nozzle members 67 and 55 so that the hot air in chamber 23 is able to pass through passages 65 out of nozzle member 67.

Let it be assumed that it is desired to solder material with the improved soldering gun and that the soldering gun is entirely cold. The acetylene torch is first lighted to produce a flame 69. This flame is so adjusted that the portion projecting beyond the opening 52 is a very light blue flame and substantially non-oxidizing. It is to be understood that this adjustment is obtained by regulation of the oxygen and acetylene controls which are conventionally provided in an acetylene welding torch. In a very few minutes, the solder contained in receptacle 41 will be in a molten state so that it is possible to perform the soldering operation. Prior to the actual soldering operation, it is, of course, necessary to tin the work to be soldered, this being done in the conventional manner. The trigger lever 19 is then pulled inwardly while the hand grasps the handle 11. The pulling in of trigger lever 19 causes compressed air to be admitted to chamber 23 and the valve 56 to be opened to permit flow of solder through passage 54. The molten solder flows through passage 54 through the nozzle member 55. The air flows through the passage 23 which, as previously indicated, extends around the burner chamber 36 so that the air is heated, through the passages 65, and then through the outer nozzle member 67. The solder upon leaving the nozzle member 55 is carried by the air with considerable force, the direction of travel of the air and solder being such that the solder enters the path of the flame. The result of this is that the solder and the flame travel over substantially the same path so that the flame and the solder are applied to identically the same spot of the material being worked on. The effect of the flame is to heat the surface of the material so as to enable the solder to adhere thereto. The flame serves further to break up the solder and permit the application of a more uniform coating than would otherwise be possible.

It is to be noted that the solder is substantially unexposed to the air in its travel from the receptacle 41 through the passage 54 to the material being soldered. In the first place, the solder is drawn from the under side of the solder in the receptacle so that if any oxygen enters the chamber 41 it will only affect the top side of the solder, which is not used. The solder drawn from the under side is protected from the air during the entire passage through passage 54. Almost immediately upon leaving the nozzle member 55, it is enveloped by the flame 69 which, by this time, is substantially non-oxidizing. Thus at no time in the passage of the solder from the receptacle to the work is it exposed, to any appreciable extent, to an oxidizing atmosphere. The result is that a much better soldered joint is obtained. A soldered joint formed by the use of the present spray gun can be remelted and reformed without any weakening of the joint. This is impossible with the joint formed in the conventional manner after the same has once been paddled.

The form of the invention which has been described above is adapted for use with a conventional acetylene welding torch. This species has the advantage of using existing equipment available in any metal working shop. This modification has the further advantage that the solder is very quickly melted by reason of the intense heat of the torch. In certain instances, however, it may be more desirable to have a complete unit which is always ready for operation. In some cases it may also be desirable to have a flame of less intensity so that it is impossible to burn the apparatus by careless handling. The species shown in Figures 10 and 11 is of this nature. Inasmuch as the handle portion 70 of this species is the only portion that is different, the body portion 10 has not been shown in detail and will not be described in connection with this second species.

Referring to Figure 10, it will be noted that a handle portion 70 comprises two chambers 72 and 73, chamber 72 being an air chamber and chamber 73 an acetylene chamber. Communicating with chambers 72 and 73 are pipes 74 and 75 leading to sources of compressed air and acetylene, respectively. Adjacent to the chamber 72 is a second chamber 76. A hollow cylinder 77 which corresponds to the cylinder 15 extends between the two chambers. This cylinder, like cylinder 15, is closed at its inner end and is provided with apertures 78 and 79, apertures 78 opening into chamber 72 and apertures 79 into chamber 76. A valve controls communication between apertures 78 and 79 and hence controls communication between chambers 72 and 76. This valve is provided with a valve stem 80 and the entire valve is biased to closed position. A trigger lever 81 is employed for moving the valve to open position. The chamber 76 is provided with a tubular extension 82 which is secured by a suitable coupling member 83 to the interior of chamber 23 of body portion 10. Referring to Figure 9, it will be noted that there are two openings 83 and 84 in the body portion 10. Both of these openings communicate with the air chamber 23. In the species of Figures 1 to 9, the pipe 28 of the welding torch extends upwardly in line with the center of the apparatus so that it is impossible for the air pipe 21 to extend parallel to the center line of the gun. As best indicated in Figure 3, the pipe 21, in this species, extends at an angle to make room for the burner tip 29 of the welding torch. In this species, the air pipe 21 extends into the opening 83 which is laterally displaced from the center line of the apparatus. In the species of Figures 10 and 11, however, the air pipe 82 is connected to the opening 84 which lies on the center line of the device. It is to be understood that in either species the opening not used is covered in any suitable manner such as by an unperforated portion of the handle portion of the device.

Communicating with the acetylene chamber 73 is a pipe 86 which is rigidly secured to the handle portion 76 and which leads to a mixing chamber 87. The mixing chamber 87, is, in turn, connected to a burner pipe 88 which extends through the opening 35 of the body portion 10. The amount of gas entering the mixing chamber 87 is regulated by a valve, the valve stem of which is indicated by the reference numeral 89. A knob 90 is secured to the valve stem 89 for manipulation of the stem. The valve stem 89 is packed by any suitable packing arrangement such as packing 92 and a gland nut 93. It is to be understood that turning of knob 90 regulates the intensity of the burner flame issuing from the burner pipe 88. The upper portion of the handle portion 70 is hollow and is covered by a cover member 94 of sheet metal. This cover member is provided with an opening 95 for the admission of air to support combustion. A portion of this air enters openings 96 in the mixing chamber 87 and the rest of the air passes through the space between burner pipe 88 and opening 35 and through the passages 50 shown in Figure 9.

The trigger member 81 is provided with a lever 63 identical to the lever 63 of the previous species, and the linkage as in the previous species. The actuation of trigger lever 19, accordingly, has the same effect as in the previous species. In other words, when the trigger lever 19 is moved inwardly, air is able to pass from chamber 72 into chamber 76 through the tubular extension 82 into air chamber 23 and out of the nozzle 67. At the same time, the valve member 56 is raised to permit solder to issue from the nozzle member 55. A soldering gun of this species has substantially the same advantages as those outlined for the soldering gun of the previously described species. Because of the fact that the flame is slightly less intense, a somewhat longer period is required to initially heat up the solder. On the other hand, the device can be safely left in operation continuously so that the solder is maintained in its liquid state. This species also has the advantage of requiring no other apparatus, it being an entirely complete unit in itself.

While the device has been described as a solder spray gun and while I have found it particularly advantageous for that purpose, it is to be understood that the device may be used generally for spraying metals and that various features thereof are of utility in any metal-spraying device. In general, while I have shown certain specific improvements of the invention for the purpose of illustration, it is to be understood that the invention is limited only by the scope of the appended claims.

I claim:

1. In a metal spraying device, a receptacle for the metal, a nozzle through which the metal is projected, a passage between said receptacle and said nozzle for said metal, a conduit for conveying compressed air to said nozzle, a burner, and an open ended passage for the burner flame between the metal receptacle and the air conduit and through which the burner flame projects onto the surface to be coated so as to heat simultaneously the metal in the receptacle, the air passing to the nozzle, and the surface to be coated.

2. In a metal spraying device, a receptacle for the metal, a nozzle through which the metal is projected, a passage between said receptacle and said nozzle for said metal, a cylindrical open ended burner chamber immediately beneath said receptacle, a burner, means for securing said burner with respect to said chamber so that the burner flame projects through said chamber onto the material to be coated, an air chamber extending substantially the full length of said burner chamber and concentrically partially surrounding said burner chamber, and means for conveying compressed air through said air chamber to said nozzle.

3. In a molten liquid spraying device, a receptacle for the material to be melted and sprayed, a nozzle, a passage between the receptacle and the nozzle, a burner, an elongated burner chamber beneath the receptacle for the full length thereof, and means for conveying compressed air to said nozzle, said conveying means including a chamber extending longitudinally adjacent to said burner chamber, said receptacle and said air chamber being contiguous and completely enclosing said burner chamber so that the heat within the chamber can pass directly only to the receptacle and the air chamber.

CLYDE M. MOURER.